US009310769B2

(12) United States Patent
Smithwick

(10) Patent No.: US 9,310,769 B2
(45) Date of Patent: Apr. 12, 2016

(54) COARSE INTEGRAL HOLOGRAPHIC DISPLAY

(71) Applicant: DISNEY ENTERPRISES, INC., Burbank, CA (US)

(72) Inventor: Quinn Smithwick, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 266 days.

(21) Appl. No.: 13/852,456

(22) Filed: Mar. 28, 2013

(65) Prior Publication Data

US 2014/0293385 A1    Oct. 2, 2014

(51) Int. Cl.
*G03H 1/08* (2006.01)
*G03H 1/26* (2006.01)
(Continued)

(52) U.S. Cl.
CPC ............... *G03H 1/26* (2013.01); *G03H 1/2205* (2013.01); *G03H 1/2294* (2013.01); *G03H 1/268* (2013.01); *G03H 2001/0421* (2013.01); *G03H 2001/2242* (2013.01); *G03H 2001/2292* (2013.01);
(Continued)

(58) Field of Classification Search
CPC ... G03H 1/2294; G03H 1/08; G03H 2210/30; G03H 1/2286; G03H 1/26; G03H 1/0005; G03H 2001/0224; G03H 1/0248; G03H 2001/2242; G03H 2222/34; G03H 2225/55; G03H 2225/60; G03H 1/265; G03H 2001/2236; G03H 2001/0413; G03H 2210/22; G03H 2226/02; G03H 1/04; G03H 1/10; G03H 1/28; G03H 2001/0426; G03H 2001/0421

USPC ........ 359/9, 10, 11, 21, 22, 24, 25, 28, 32, 35
See application file for complete search history.

(56) References Cited

U.S. PATENT DOCUMENTS 6,195,184 B1   2/2001   Chao
7,150,531 B2   12/2006  Toeppen
(Continued)

FOREIGN PATENT DOCUMENTS

JP       09113846      5/1997
JP    2009545762 A    12/2009

OTHER PUBLICATIONS

Extended European Search Report from EP14151681 dated Apr. 17, 2014.
(Continued)

*Primary Examiner* — Jade R Chwasz
(74) *Attorney, Agent, or Firm* — Marsh Fischmann & Breyfogle LLP; Kent A. Lembke

(57) ABSTRACT

A holographic display system for generating a super hologram with full parallax in different fields of view in the horizontal and vertical directions. The system includes an array of holographic display devices, e.g., spatial light modulators (SLMs), operable to provide a plurality of holographic images of a scene from differing viewpoints of the scene. Each SLM is operated concurrently to output a narrow field of view, elemental hologram. The system includes coarse integral optics combining the holographic images into a single hologram ("super hologram") viewable in a hologram image plane a distance from the course integral optics. The coarse integral optics combine the holographic images by providing angular tiling of the holographic images, e.g., bending the axes of parallel lenses. In this manner, the field of view, in one direction, of the super hologram is based on the number of holographic display devices provided in the array in one direction.

18 Claims, 5 Drawing Sheets

(51) Int. Cl.
*G03H 1/28* (2006.01)
*G03H 1/22* (2006.01)
*G03H 1/04* (2006.01)

(52) U.S. Cl.
CPC ........ *G03H2210/30* (2013.01); *G03H 2223/19* (2013.01); *G03H 2225/60* (2013.01); *G03H 2226/05* (2013.01)

(56) References Cited

U.S. PATENT DOCUMENTS

| | | |
|---|---|---|
| 7,317,564 B2 | 1/2008 | Payne |
| 7,446,733 B1 | 11/2008 | Hirimai |
| 7,513,623 B2 | 4/2009 | Thomas |
| 7,699,472 B2 | 4/2010 | Shestak |
| 7,775,666 B2 | 8/2010 | Kubara |
| 2008/0074742 A1 | 3/2008 | Kim |
| 2008/0144174 A1 | 6/2008 | Lucente et al. |
| 2010/0079831 A1 | 4/2010 | Renaud-Goud |
| 2010/0097672 A1 | 4/2010 | Leister |
| 2010/0103485 A1 | 4/2010 | Haussler |
| 2010/0271677 A1 | 10/2010 | Smith |
| 2011/0304895 A1 | 12/2011 | Schwerdtner |

OTHER PUBLICATIONS

Balogh "A Scalable Holographic Display for Interactive Graphics Applications" in Proc. IEEE VR 2005 Workshop on Emerging Display Technologies. Retrieved from Internet at: http://citeseerx.ist.psu.edu/viewdoc/download?doi=10.1.1.66.2965&rep=rep1&type=pdf Mar. 1, 2005.

Agus et al, "Towards Advanced Volumetric Display of the Human Musculoskeletal System" Published in Eurgraphics Italian Chapter Conference. Retrieved from the Internet at: http://www.crs4it./vic/data/papers/egit2008-movr.pdf Jan. 1, 2008.

Benzie et al, "A Survey of 3DTV Displays: Techniques and Technologies" Published in IEEE transactions on circuits and systems for Video Technology, vol. 17, No. 11. Retrieved from the Internet at: http://home.ku.edu.tr/~hurey/webdocs/urey_scvt2007.pdf Nov. 11, 2007.

Hahn, Jeonku, et al, "Wide Viewint Angle Dynamic Holographic Stereogram with a Curved Array of Spatial Light Modulators," Optics Express, Aug. 4, 2008, vol. 16, No. 16.

Yamamoto, Kenji, et al, "3D Objects Enlargement Method Using an Optical System and Multiple SLMs for Electronic Holography," 2012 by ITE, NII-Electronic Library Service.

Japanese Office Action, Mailing Date Dec. 16, 2014.

COARSE INTEGRAL HOLOGRAPHIC DISPLAY

BACKGROUND

1. Field of the Description

The present invention relates, in general, to holography and holographic displays, and, more particularly, to a coarse integral holographic display that combines a plurality of spatial light modulators (or multiple images from a single spatial light modulator) to form a modestly sized, wide field of view (fov) display with a quantity or amount of vertical parallax (e.g., limited vertical parallax in contrast to a horizontal parallax only (HPO) display).

2. Relevant Background

Holography is a technique that enables three-dimensional (3D) images to be generated, recorded, and later displayed. It typically involves the use of a laser, interference, diffraction, light intensity recording, and suitable illumination of the recording. The image changes as the position and orientation of the viewing system changes in exactly the same way as if the object were still present, thereby making the image appear in 3D. The holographic recording itself is not an image as it is made up of an apparently random structure of varying intensity, density, or profile.

As the demand for 3D displays rapidly grows, holographic displays are considered by many within the 3D entertainment industry as the ultimate goal of 3D displays. Such high regard is held for these devices because holographic displays are capable of displaying all the 3D cues of a real scene to a viewer. Unfortunately, to date, designing and fabricating holographic displays have proven difficult due to one or more difficult challenges that have limited display size, field of view, frame rate, and/or prevented providing both horizontal and vertical parallax.

In this regard, to create a large holographic display with a wide field of view (fov), the pitch of the display's spatial light modulator (SLM) must be fine (e.g., less than 1 micrometer (μm) and more typically less than 0.5 μm for an approximately 30° fov) over a large area (e.g., 127 millimeters (mm) by 100 mm or the like). Unfortunately, the pitches of common SLMs, such as digital mirror devices (DMDs) or liquid crystal on silicon (LCOS) devices, are typically only as coarse as about 5 to 10 μm and are the same horizontally and vertically, providing only 1° to 3° fov. Further, the pitches are only maintained over small areas in these devices such as over 20 mm by 20 mm. Demagnifying optics can be used to increase the pitch and field of view but at the generally unacceptable expense of the image size (and vice versa) due to the Lagrange Invariant (i.e., for an optical system of only lenses, the product of the image size and ray angle is constant).

In some attempts to provide an improved holographic display, multiple SLMs have been tiled together to increase either the size or field of view of the hologram. With simple spatial tiling of multiple SLMs to increase the size of the hologram, however, there are noticeable seams in the holographic image due to gaps between the SLMs from the borders and electronics. Spatial tiling a single SLM has also been achieved using replication optics or using 2-axis scanners. Gaps and misalignments in the spatial tiling appear at the hologram plane and visually interfere with and confuse the 3D imagery. Multiple SLMs have also been arranged in an arc, with precision optical mounts, to increase the field of view. The holographic images overlap in the center of the arc a far distance from the SLMs, with a corresponding reduction in the holographic image's resolution the further the distance from the SLM. Several of these systems use an asymmetric diffusing screen, producing horizontal parallax only (HPO) images. Accousto-optical modulators (AOMs) are capable of providing traveling acoustic waves of pitches of about 5 μm over larger lengths. These large lengths can be arranged into widths of about 1 meter by heights of about 100 mm. However, to cancel the motion of the traveling waves, descanning optics and scanners are required. Also, other optics may be required to create higher pitches at the expense of display width. Further, the acoustic waves only diffract in one direction, and the resulting hologram is necessarily HPO.

Due to the horizontal arrangement of the human eyes, horizontal parallax is more important than vertical parallax for binocular stereopsis and motion parallax. This fact is often used in horizontal parallax only (HPO) holographic displays to reduce computation and data bandwidth requirements compared to full parallax holographic displays. However, the appearance of the HPO hologram does not change with vertical motion of the viewer and their viewing location or point of view. In other words, a single viewer may move their head up and down vertically (e.g., be sitting or squatting and then stand up), and the hologram's appearance would not change as would a true 3D object. In some artistic and entertainment applications, especially those provided for single stationary viewers, the loss of vertical parallax may be acceptable.

However, vertical parallax is important to fix absolute position in space. In many 3D display implementations, the loss of vertical parallax is not acceptable, which has led some experts in the 3D display industry to argue that a holographic display that is HPO is a "non-starter." For example, in implementations involving interaction with the hologram or involving multiple viewers that collaborate (e.g., point to or interact with the same location on the holographic image), the holographic display will be ineffective unless there is at least a small amount of vertical parallax. Such "limited vertical parallax" may be necessary for the viewers to see or experience a consistent scene from differing points of view. Due to human kinetics (e.g., it is easier for humans to shift their views left and right than up and down), the amount of desirable vertical parallax is often much lower than a desirable amount of horizontal parallax.

Hence, there is a need for holographic displays or holographic display systems that address some of these challenges. Preferably, such new holographic displays would provide a relatively large 3D image or hologram and would provide some amount of vertical parallax (e.g., provide limited vertical parallax). An issue, though, facing such development is that providing different amounts of information and fields of view in the horizontal and vertical directions is difficult with current full parallax holographic displays. With common square pixel SLMs, the horizontal and vertical pitches and, therefore, the fields of view are the same (unless anamorphic optics are used, which often is not desirable due to astigmatic aberrations, cost, manufacturing and design complexity, and other concerns).

SUMMARY

A holographic display or holographic display system is described herein that is adapted to combine holographic displays and coarse integral displays to produce or display a coarse integral hologram. The displays and systems may be thought of as using a method of combining several low pitch, small area spatial light modulators (SLMs) and/or spatially/temporally multiplexing a single SLM to form a modestly sized, wide horizontal field of view display with a small amount of vertical parallax (e.g., providing limited vertical parallax rather than providing an HPO display). The horizontal and vertical information content and fields of view may be adjusted separately.

The SLMs provide a set of fully 3D images, but each with a small area and a small field of view (or "fov"). Each hologram output by the SLMs reproduces a different narrow viewpoint of the same 3D scene. The coarse integral optics angularly tiles the multiple narrow field of view holograms into a single large field of view hologram.

More particularly, a holographic display system is provided to generate a full parallax super hologram with different fields of view in the horizontal and vertical directions. The system includes an array of holographic display devices (e.g., spatial light modulators (SLMs), which may take a number of forms to implement the system) operable to provide a plurality of holographic images of a scene from differing viewpoints of the scene. In a typical implementation, each SLM is operated concurrently to output an elemental hologram that may have a narrow field of view. The system also includes (or is combined with) a coarse integral optics assembly positioned between the array of holographic display devices and a viewing space for viewers of the holographic display system. The coarse integral optics assembly is adapted to combine the plurality of "elemental" holographic images into a single hologram ("super hologram") viewable in a hologram image plane a distance apart from the course integral optics assembly.

In practice, the coarse integral optics assembly combines the plurality of holographic images by providing angular tiling of the plurality of holographic images. In this manner, the field of view, in one direction, of the super hologram is based on the number of holographic display devices provided in the array in the one direction. The field of view of the super hologram may be asymmetric. In some implementations, the coarse integral optics assembly includes a lens array with one elemental lens centered over each one of the elemental holographic display devices (or aligned to receive the SLMs elemental hologram). In other implementations, SLMs may be scanned to spatially tile multiple elemental holograms behind corresponding and aligned lenses in a lens array. Hence, a holographic image and lens pair is created that functions as a narrow field of view 3D projector with each of the lenses in the lens array having parallel optical axes.

Further, the coarse integral optics assembly may include a transform lens (e.g., a large Fresnel lens or the like) that receives the plurality of holographic images output from the lens array (traveling along parallel axes associated with the lenses) and that combines the plurality of holographic images by bending the direction of the plurality of holographic images (e.g., the lenses axes) to cross (e.g., proximate to the image plane) and fan out. The elemental holographic images overlap at the image plane, and their fields of view abut, thereby angularly tiling their views.

In the basic system, the super hologram is the same size as the elemental images but with a field of view in each direction being the combined fields of view of the elemental holograms. The super hologram's field of view is n times wider (or taller) than the field of view of any elemental hologram, where n is the number of elemental holograms and corresponding lenses in the lens array in either direction. Because the array of elemental 3D holograms does not need to form a square array, the field of view in the horizontal direction may be different from the field of view in the vertical direction. The basic system may have a 1:1 ratio of the elemental lenses focal lengths to the transform lens focal length. For a different ratio of elemental to transform lens focal lengths, an increase in the super hologram size with a corresponding decrease in the super hologram's combined field of view (or vice versa) can be achieved in some embodiments.

The super hologram is a complete hologram itself, and it can be further demagnified or magnified (e.g., optically increased or decreased in size, with a corresponding decrease or increase in field of view). The super hologram may also be spatially tiled such as by physically arranging multiple coarse integral holographic displays or by using 2D scanning or replication optics to spatially distribute a single coarse integral holographic display. Further, the super hologram may be angularly tiled such as by placing multiple coarse integral holographic displays in an arc or using additional coarse integral optics.

The SLMs may selectively display their elemental holograms, allowing the hologram only to be viewed within certain view zones. With head tracking, only the elemental holograms within those view zones visible to viewers may be computed and displayed, which reduces computational costs.

DETAILED DESCRIPTION

Briefly, the present description provides holographic displays or holographic display systems (sometimes referred to herein as a "coarse integral holographic display") that include a plurality of spatial light modulators (SLMs). The SLMs are arranged in a side-by-side (or planar) manner and may be low pitch, small area SLMs, and the display systems are configured with coarse integral optics (or an optical assembly) to combine the output images or output light (i.e., small area and small field of view (fov) holograms) from the SLMs to form a modestly sized, displayed holographic image (a single larger area hologram with a large fov) with possibly different horizontal and vertical fields of view.

A coarse integral display may include an array of SLMs providing "elemental" 2D images, a lens array, and a large transform lens. Each elemental image in the array of 2D images is of the same scene but from different viewpoints. A lens array is placed in front of the SLMs to receive the array of 2D images, such as with one lens centered over each viewpoint image output from the SLM array. Each image-lens pair becomes or acts, in effect, as a narrow field of view projector, with such projectors' axes all being parallel in a typical implementation.

The large transform lens is selected to act or function to reimage the projectors' images and to bend the projectors' axes so that they cross and fan outward. The 2D images are thereby angularly tiled by the optics or coarse integral optical assembly. This produces a view-dependent image with a wide field of view. However, the views are discrete and discontinuous, and each image is still 2D. An apparent 3D image may be seen, but the coarse integral display has discrete views and does not support accommodation cues for a reasonable number of views.

With this in mind, the inventor recognized that it may be desirable and useful to operate the SLMs of the array to provide an array of elemental holographic displays rather than elemental 2D images in the coarse integral display. In this way, each element in the output coarse integral hologram is a narrow field of view 3D hologram that includes all 3D cues including stereopsis, accommodation (focus), and vergence cues. Also, and significantly, the output or produced 3D hologram has continuous horizontal and vertical parallax. The course integral optics is designed to (and does act to) tile the viewpoints of many narrow field of view elemental holographic displays (e.g., SLMs) into a single, large field of view or "super" holographic display. It should also be understood that because the array of elemental 3D holograms provided by the array of SLMs does not need to form a square array, the field of view in the horizontal direction may be different from that of the vertical direction.

Figure 1:
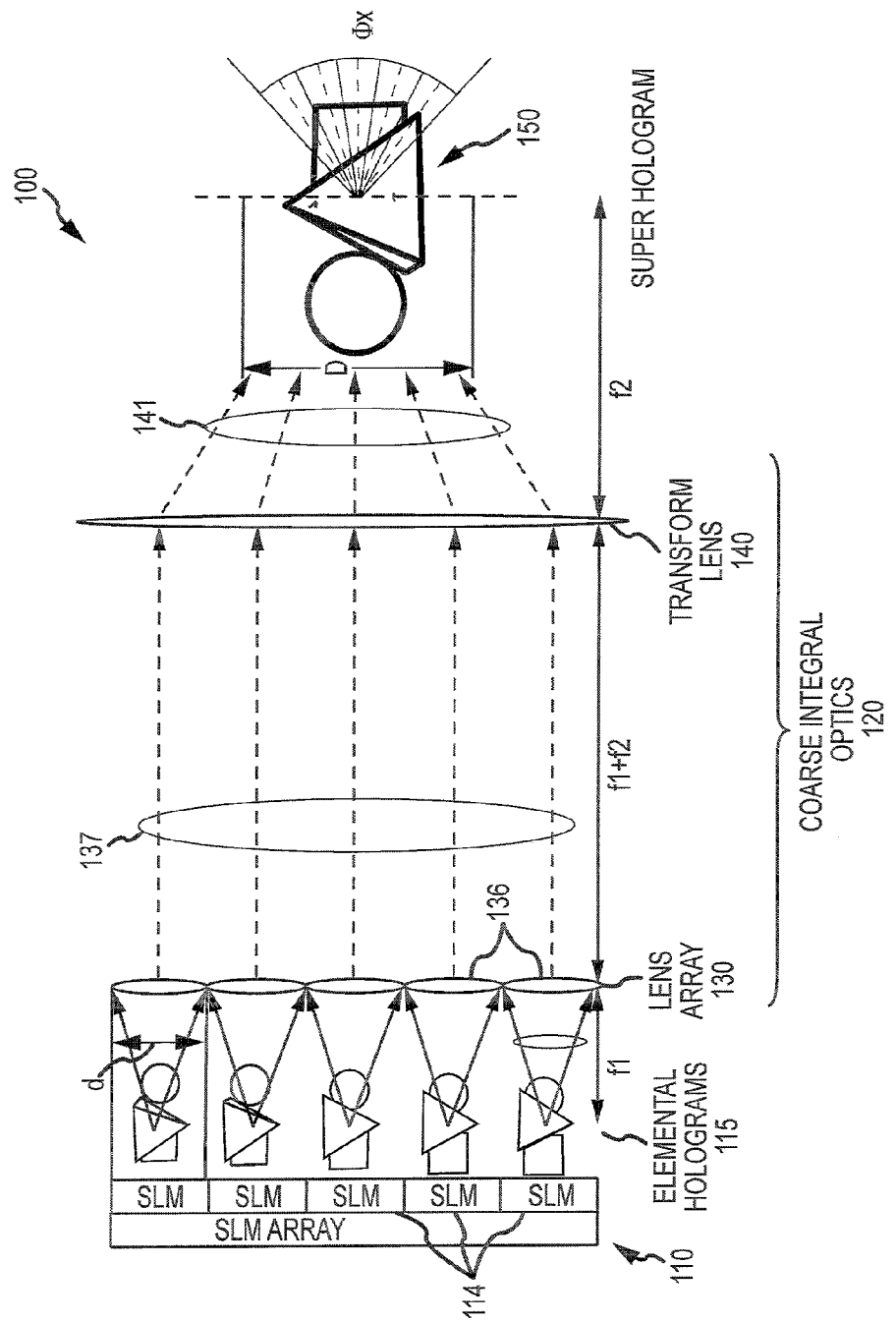
FIG. 1 illustrates in schematic or functional block form one embodiment of a holographic display or coarse integral display system described herein.

FIG. 1 illustrates one embodiment of a holographic display system 100 that uses these concepts to produce an angularly tiled 3D hologram or super hologram 150 (e.g., a sphere, a cube, and/or a pyramid in this illustrated example). Briefly, the system 100 is shown to include an array 110 of hologram sources/projectors 114, which may take the form of SLMs such as digital mirror devices (DMDs), liquid crystal on silicon (LCOS) devices, optically addressed SLMs (OASLMs), electrically addressed SLMs (EASLMs), or the like. These are each operated to output an elemental hologram 115, and these are combined by a coarse integral optical assembly 120. Particularly, the holograms 115 are displayed or projected towards a first surface or backside of a lens array 130 made up of a lens 136 for each of the hologram sources 114. From a second surface of the lens array 130, the output light 137 from the lenses 136 is directed toward a transform lens 140, which acts to combine the light/images as shown at 141 to provide the super hologram 150 from the elemental holograms 115.

In the configuration of FIG. 1, the coarse hologram system 100 may include a number (e.g., 1 to 6 or more) of SLMs 114 that are operated concurrently to provide an array of elemental holographic images 115, which are transmitted through a lens array 130 and a large transform lens 140. Typically, the SLMs 114 and elemental images 115 are located in the system 100 at or near the focal plane of the lens array 130. Further, the lens array 130 and the large transform lens 140 are spaced apart by the sum of their focal lengths as shown in FIG. 1 so as to form an afocal 4f magnified relay system with assembly 120. The resulting super hologram plane of output hologram 150 is located at the focal plane of the large transform lens 140.

The numerical aperture (light gathering capacity) of each of the elemental holograms and its corresponding lenslet should be matched, leading to the relation $d=2f_1 \sin(\theta)$, where $\theta$ is the angle of diffraction due to the pitch of the SLMs 114 and $f_1$ is the focal length of one of the lenses 136 in the lenslet array 130. The size, D, of the super hologram 150 may be stated as $D=f_2/f_1 \, d$, where $f_2$ is the focal length of the large transform lens 140.

The field of view in one direction of the super hologram 150 is $\Phi_{x,y}=n_{x,y} \cdot f_1/f_2 \cdot \theta$, where $n_x$ or $n_y$ is the number of elemental images 115 in that direction. The number of elemental images 115 (i.e., number of SLMs 114 in the array 110) can be selected to be different in the horizontal and vertical directions (i.e., $n_x$ does not have to equal $n_y$), which can be used to provide different fields of view for hologram 150. The resulting hologram 150 may be further demagnified to decrease its image size and increase its field of view (or vice versa) in particular implementations of the system 100.

A coarse integral holographic display can be used to generate holographic images or super holograms that exhibit full parallax with different fields of view in the horizontal and vertical directions. The super hologram also exhibits accommodation, occlusion, and view-dependent shading. The holographic image appears to the viewer to be a real image floating in front of the display (e.g., in front of the transform lens). The entire volume of the holographic image, in front of and behind the super hologram plane, is accessible for interactive applications, which may require or prefer to have full parallax.

Based on the inventor's design, it is believed that course integral holographic displays can be built or manufactured to effectively use coarse integral optics. These optics or optical assemblies will allow output images from multiple SLMs to be combined efficiently, which will increase the holographic display's space-bandwidth product (e.g., information capacity). The space-bandwidth product can be flexibly assigned such as more to the horizontal field of view than the vertical field of view. Furthermore, the field of view can be displaced or not centered about the transform lens' optical axis, which can be useful in displays that may be normally or often viewed off axis, such as table displays.

Although many SLMs have coarse pitches over small areas, many SLMs are capable of high bandwidth and frame rates, e.g., DMDs are capable of several thousand binary frames per second. Only 15 to 60 frames per second are needed for apparent continuous motion. The additional bandwidth/frames per second can be used to sequentially create multiple elemental holograms with a single SLM, which can then be spatially tiled behind the lens array using 2D scanners and then angularly tiled using the coarse integral optics. The SLM temporally multiplexes the elemental holograms, the 2D scanner spatially multiplexes the elemental holograms, and the coarse integral optics angularly multiplexes the elemental holograms.

The scanning system may include an SLM, a 4f optical relay, and a scanner located at the optical relay's Fourier plane. The SLM is located at the front focal plane of the first lens. The scanner is located at the rear focal plane of the first lens and also the front focal plane of the second lens (scanning on the Fourier plane). The scanned and translated SLM image is located at the rear focal plane of the second lens. The SLM rapidly displays elemental holograms (computed to display holographic images from the appropriate viewpoints) that are synchronized to the 2D scanner and SLM image location. To tile the SLM image without motion blur caused by scanning, the SLM illumination can be flashed when the scanner and SLM image are at the tile locations. The scanner spatially tiles multiple SLM images behind the lenslet array. As with other configurations, a large transform lens is provided for angularly tiling the rapid sequence of elemental holograms generated by the single SLM into a super hologram.

The display systems taught herein may be thought of as providing angular tiling with their coarse integral optics. Such angular tiling has advantages over spatial tiling of SLMs. With spatial tiling, there are noticeable seams in the generated or output holographic image due to gaps between the SLMs from the borders and electronics. Gaps and misalignments in the spatial tiling appear at the hologram plane and visually interfere with and confuse the 3D imagery.

In contrast, with angular tiling as provided by the displays of the present description, the seams appear as gaps in the angular views. Small missing view zones are visually less obtrusive and can further be blended using a light diffuser (not shown in FIG. 1 but readily understood by those skilled in the art). Angular misalignments result in disjointed motion parallax. The angular tiling also lends itself to view-dependent holographic rendering algorithms, such as holographic stereogram and diffraction specific parallax panoramagrams. Further, view-dependent holographic algorithms naturally handle view-dependent lighting and shading, occlusion, and accommodation cues in the holographic images.

With the above description in mind, it may be useful to explain some of these concepts again and/or in more detail to clarify how one may implement a holographic display by combining multiple spatial light modulators to achieve a larger holographic output or 3D displayed image while providing at least some amount of vertical parallax. The proposed solution or display system combines holographic displays with coarse integral displays. The holographic displays (e.g., an array of SLMs) provide a set or array of fully 3D images (e.g., elemental holograms) but with a small area and a low fov. Each of these small holograms is a different (narrow) viewpoint of the same 3D scene. The coarse integral display (or coarse integral optical assembly or optics) combines the multiple narrow field of view holograms into a single large (in size and fov) hologram or "super hologram."

Figure 2:
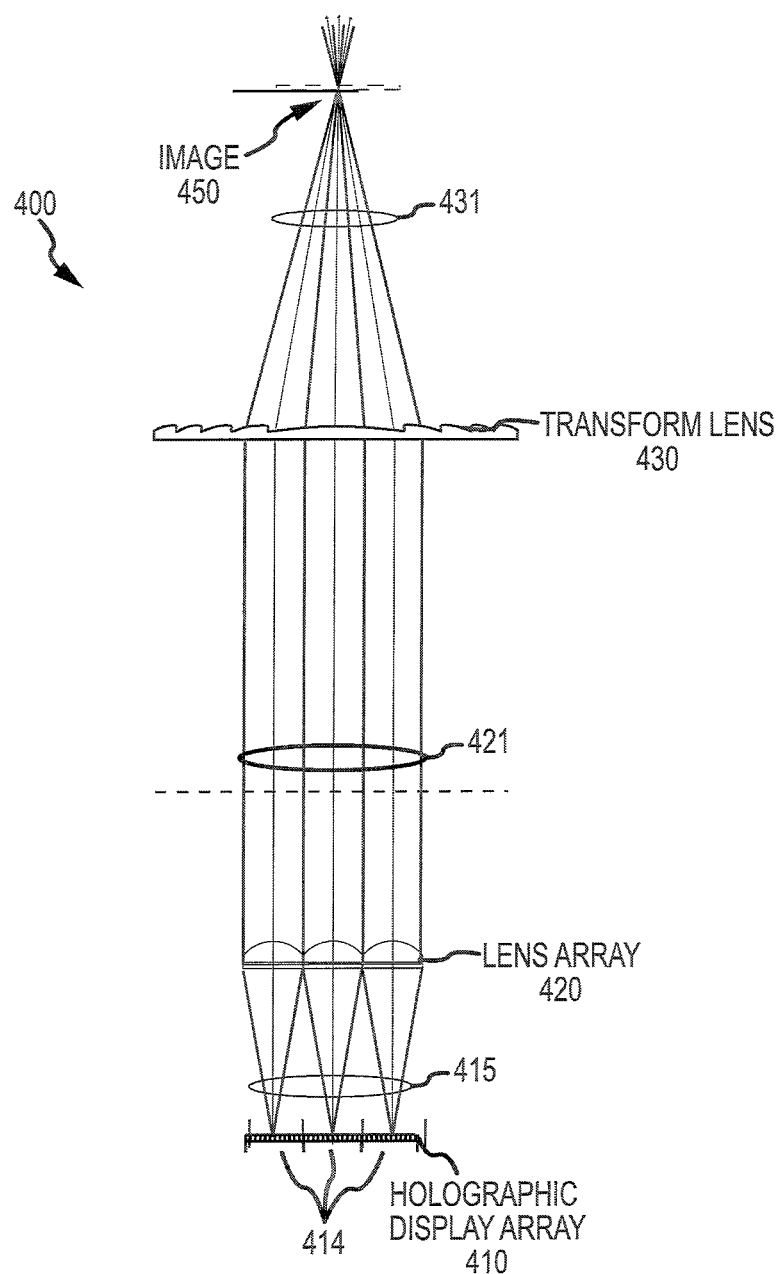
FIG. 2 illustrates a coarse integral display that includes an array of image sources that each provides a 2D image.

FIG. 2 illustrates a coarse integral optical system 400 that includes an array 410 of image sources 414 that each provides a 2D image 415 (e.g., 3 degrees each). The coarse integral display 400 further includes a lens array 420 focusing the 2D images 415 onto a large transform lens 430, which combines the images as shown at 431 to provide an image 450 with an increased field of view.

Each elemental image 415 from the array 410, which is operated to provide 2D images, is of the same scene but from a different point of view. The lens array 420 is placed in front of the array 410, with one lens centered over one viewpoint image 415. For example, when three images 415 are provided by the array 410, the lens array 420 would provide 3 lenses with one centered over each image source 414 of the array 410. Each lens/image pair acts as or becomes a narrow field of view projector providing the output 421, with the projectors' axes being aligned in parallel.

The large transform lens 430 reimages as shown at 431 the projectors' images/output 421 and bends the projectors' axes so they cross and fan outward. This produces a view-dependent image 450 with a wide field of view. However, the inventor recognized that the views provided in image 450 of the scene are discrete and disjointed and each image in the output 431 is still 2D.

Figure 3:
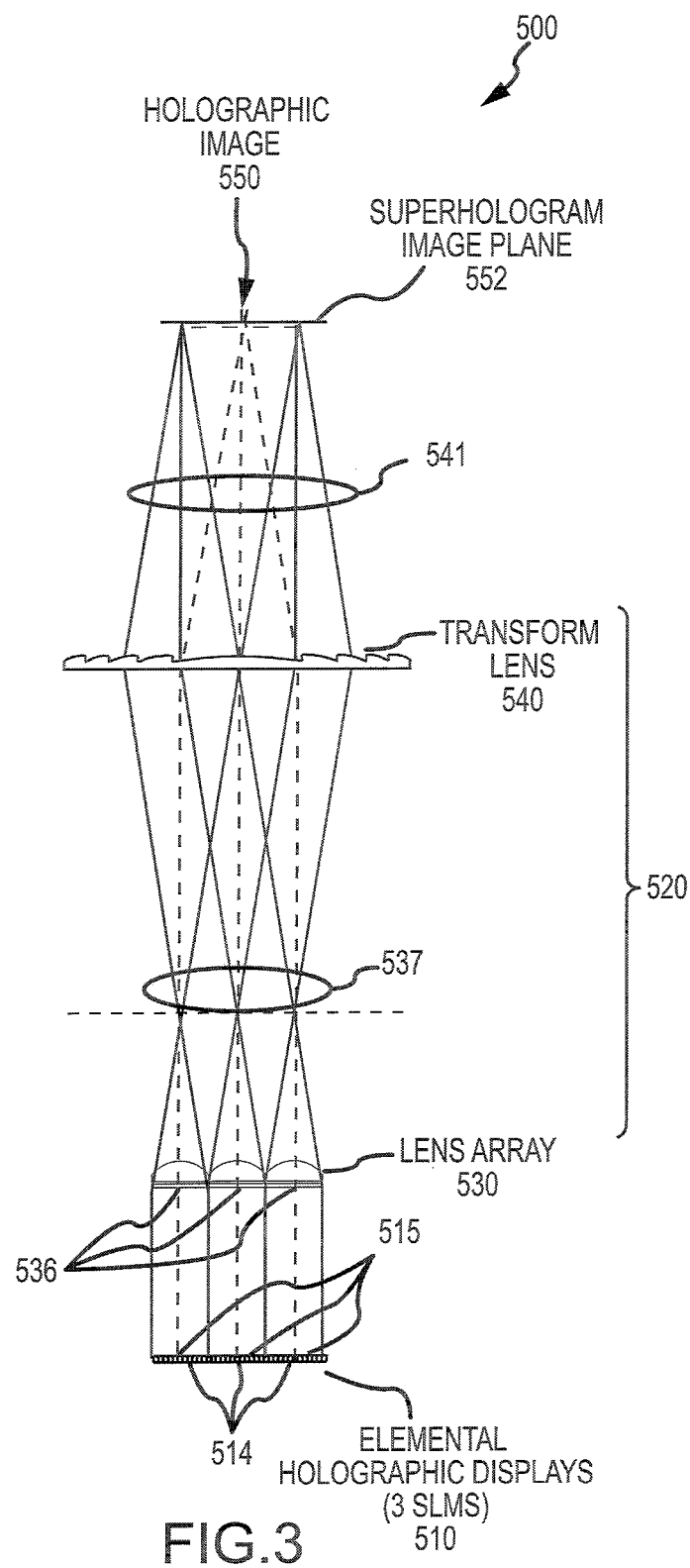
FIG. 3 is an exemplary coarse integral holographic display.

With this recognition in mind along with the desire for improved 3D displays, the inventor designed the coarse integral holographic display 500 of FIG. 3. By using an array 510 of holographic displays 514 for providing elemental holographic images 515 rather than 2D images 415, each view in the output holographic image 550 at the image plane 552 is a narrow field of view 3D hologram including accommodation cues and smooth (horizontal and vertical) parallax. For example, as shown, the display 500 may include an array of three SLMs (e.g., 50 mm sources) each operated to provide an elemental holographic image of a scene from a different viewpoint.

The display 500 may also be examined from the viewpoint of the super hologram 550. From this viewpoint, the incorporation of a coarse integral display or optical assembly 520 tiles the viewpoints of many narrow field of view "elemental" holographic displays into a single large field of view "super" holographic display. Particularly, an optical assembly 520 is provided with a lens array 530 providing a lens 536 for each of the elemental holographic images 515 of the SLMs 514, and it outputs its light/images 537 to a large transform lens 540. The lens 540 combines the images 515 and bends the axes of the SLM/lens pairs to provide the super hologram 550 with an image plane 550. The area of the displayed hologram 550 is the size of a single "elemental" holographic display image 515.

Using separate optics (e.g., a demagnifying relay) or through the appropriate spacing between the elemental holographic displays 514, the lens array 530, and the transform lens 540, the large field of view can be reduced to make or provide a larger sized display or output hologram 550. The process of using a coarse integral display optics 520 to combine smaller field of view holographic displays 514 creating a larger field of view display then reducing the field of view to increase the size of the images 550 can be repeated or cascaded (with the limits of increasing noise and aberrations). In an alternative embodiment, a single SLM 514 is used and images 515 are projected from the single SLM 514 onto each lens 536 of the lens array 530. The lens array 530 may be spherical, fresnel or holographic lenses in implementing the system 500.

Alternatively, using optics (e.g., a demagnifying relay), the size of each elemental holographic display may be increased (with their fields of view decreased) before the lens array and integrating lens. In either case, to achieve a holographic display of a given size and field of view, approximately the same number of "elemental" holographic displays are needed.

Figure 4A:
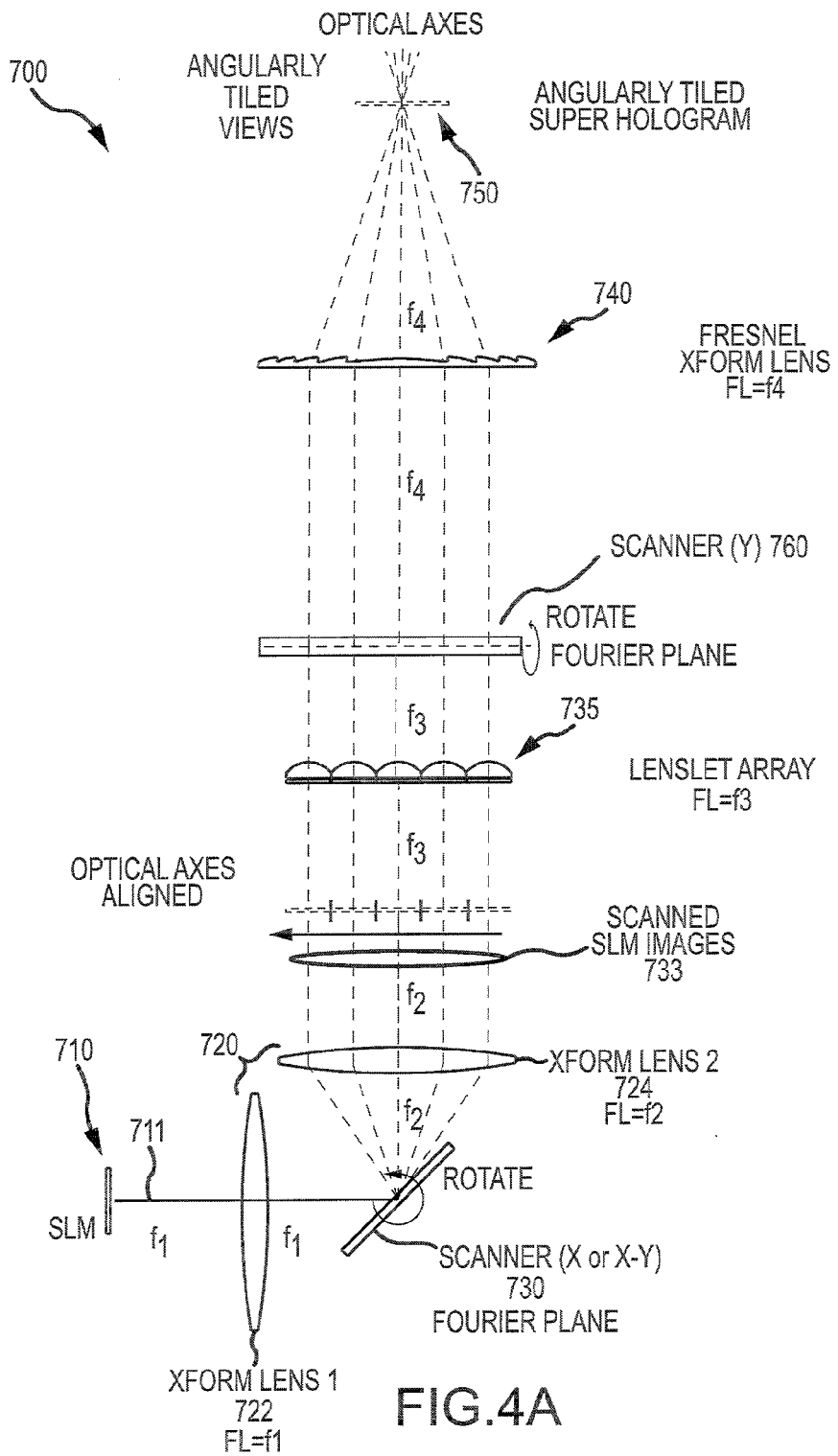
FIGS. 4A and 4B illustrate a coarse integral display that uses a single image source and scanning to provide a super hologram.
Figure 4B:
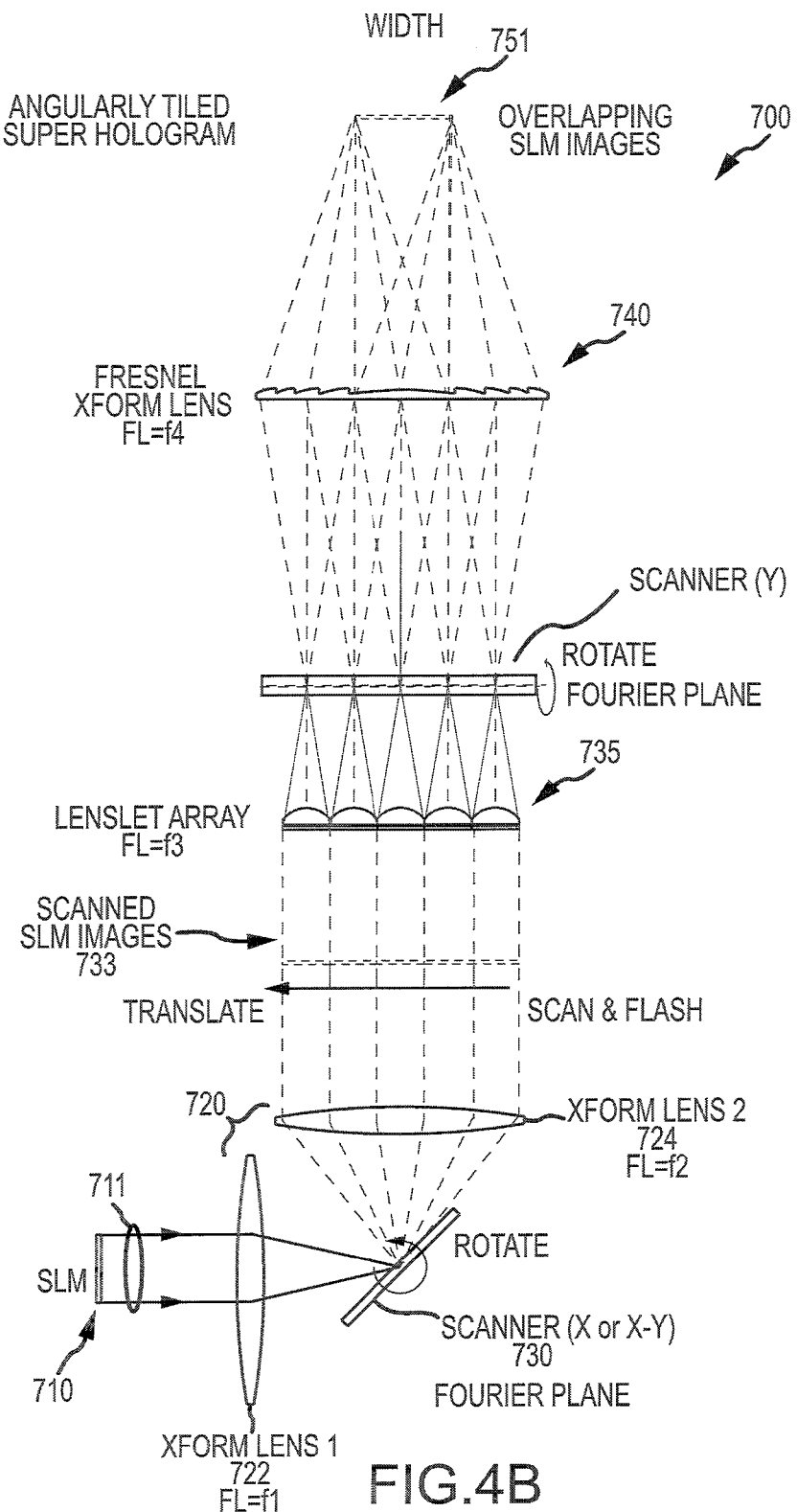

As discussed above, a single image source (e.g., an SLM) may be used along with 2D scanners to provide a super hologram. This is shown in FIGS. 4A and 4B with coarse integral holographic display 700 that is used to provide a super hologram 750 with angularly tiled views (e.g., with crossing optical axes) and a super hologram 751 with overlapping SLM images (e.g., with width).

As shown, the display system 700 includes an SLM 710 and an optical relay (e.g., a 4f relay) 720 with a first and second lens 722 and 724, respectively. The system 700 includes a scanner 730 disposed between the first and second lenses 722, 724 such as at the optical relay's Fourier plane. The SLM 710 may be located at the front focal plan of the first lens 722, and the scanner 730 may be located at the rear focal plane of the first lens 722 and at the front focal plane of the second lens 724.

The scanned and translated SLM image 733 may be located at the rear focal plane of the second lens 724. During operation, the SLM 710 rapidly displays elemental holograms 711 that are synchronized to the 2D scanner 730 (and also to the SLM image location). The scanner 730 is adapted and controlled to spatially tile multiple SLM images 711 behind a lenslet array 735 and large transform lens 740, which act to angularly tile the rapid sequence of elemental holograms 711 generated by the SLM 710 into a super hologram 750 or 751.

The horizontal (x) and vertical (y) scanning can be done by a (x-y) scanner 730 and a 2D lenslet array 735, or scanning can be divided between a horizontal (x) scanner 730 and a vertical scanner (y) 760, at another Fourier plane between the lenslet array and the Fresnel lens, and a 1D horizontal lenslet array 735.

I claim:
1. A holographic display system, comprising:
    an array of holographic display devices operable to provide a plurality of holographic images of a scene from differing viewpoints of the scene; and
    a coarse integral optics assembly positioned between the array of holographic display devices and a viewing space for the holographic display system, the coarse integral optics assembly combining the plurality of holographic images into a single hologram viewable in a hologram image plane in the viewing space a distance apart from the course integral optics assembly, wherein the combining by the coarse integral optics assembly comprises angularly tiling the plurality of holographic images such that optical axes of the plurality of holographic images cross at the hologram image plane, whereby the single hologram has continuous horizontal and vertical parallax.

2. The system of claim 1, wherein the holographic display devices each comprise a spatial light modulator operable to display one of the plurality of holographic images.

3. The system of claim 2, wherein each of the plurality of holographic images comprises an elemental hologram with a narrow field of view.

4. The system of claim 1, wherein the field of view, in one direction, of the single hologram is based on the number of holographic display devices provided in the array in the one direction.

5. The system of claim 1, wherein the coarse integral optics assembly includes a lens array with one lens centered over each one of the holographic display devices, whereby a holographic image and lens pair is created that functions as a narrow field of view projector with the lenses in the lens array having parallel axes.

6. The system of claim 5, wherein the coarse integral optics assembly includes a transform lens receiving the plurality of holographic images output from the lens array and combining the plurality of holographic images by bending the plurality of holographic images to cross the optical axes of the plurality of holographic image at the image plane.

7. The system of claim 6, wherein the distance to the image plane is equal to about the focal length of the transform lens.

8. The system of claim 1, wherein the field of view of the single hologram is asymmetric with a field of view in a horizontal direction differing from a field of view in the vertical direction.

9. A holographic display system, comprising:
an array of holographic display devices providing a plurality of holographic images of a scene from differing viewpoints; and
a coarse integral optics assembly positioned between the array of holographic display devices and a viewing space,
wherein the coarse integral optics assembly combines the plurality of holographic images into a single hologram viewable in a hologram image plane in the viewing space at a distance spaced apart from the course integral optics assembly, the distance to the image plane being equal to the focal length of the transform lens,
wherein the coarse integral optics assembly includes a lens array with one lens centered over each one of the holographic display devices, whereby a holographic image and lens pair is created that functions as a narrow field of view projector with the lenses in the lens array having parallel axes, and
wherein the coarse integral optics assembly includes a transform lens receiving the plurality of holographic images output from the lens array and combining the plurality of holographic images by bending the plurality of holographic images to cross optical axes at the image plane.

10. The system of claim 9, wherein the holographic display devices each comprise a spatial light modulator operable to display one of the plurality of holographic images.

11. The system of claim 10, wherein each of the plurality of holographic images comprises an elemental hologram with a narrow field of view.

12. The system of claim 9, wherein the coarse integral optics assembly combines the plurality of holographic images by providing angular tiling of the plurality of holographic images.

13. The system of claim 12, wherein the field of view, in one direction, of the single hologram is based on the number of holographic display devices provided in the array in the one direction.

14. The system of claim 9, wherein the single hologram has vertical and horizontal parallax.

15. The system of claim 9, wherein the field of view of the single hologram is asymmetric.

16. A display apparatus, comprising:
an array of display devices each operable to provide a holographic image of a scene from a differing viewpoint; and
an optics assembly combining the holographic images from the array of display devices into a single hologram at a hologram image plane located in a viewing space and spaced apart a distance from the optics assembly,
wherein each of the display devices comprises a spatial light modulator operable to display one of the holographic images,
wherein each of the holographic images comprises an elemental hologram with a narrow field of view,
wherein the optics assembly combines the holographic images into the single hologram by providing angular tiling of the holographic images involving bending axes of the holographic images to cross in the hologram image plane or to cause the holographic images to overlap in the hologram image plane,
wherein the optics assembly includes a lens array with one lens centered over each one of the holographic display devices, whereby a holographic image and lens pair is created that functions as a narrow field of view projector with the lenses in the lens array having parallel axes, and
wherein the coarse integral optics assembly includes a transform lens receiving the plurality of holographic images output from the lens array and combining the plurality of holographic images by bending the plurality of holographic images to cross in the image plane.

17. The apparatus of claim 16, wherein the field of view, in one direction, of the single hologram is based on the number of holographic display devices provided in the array in the one direction.

18. The apparatus of claim 16, wherein the single hologram has vertical and horizontal parallax.

* * * * *